(No Model.)
B. O. CLARK.
SAFETY CLEVIS.
No. 578,211. Patented Mar. 2, 1897.
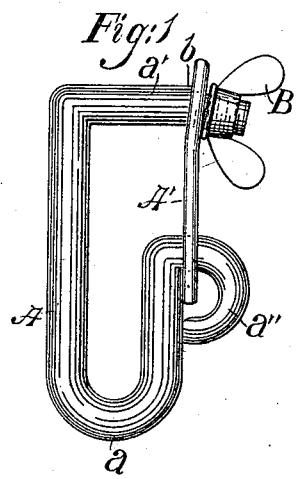
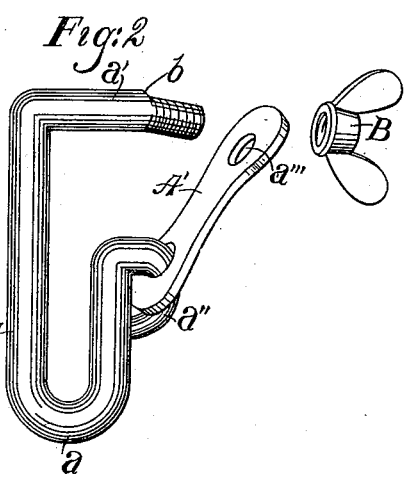
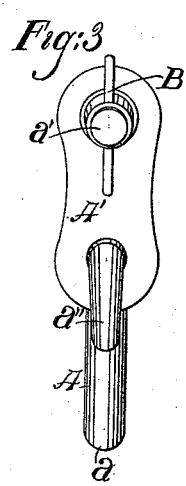
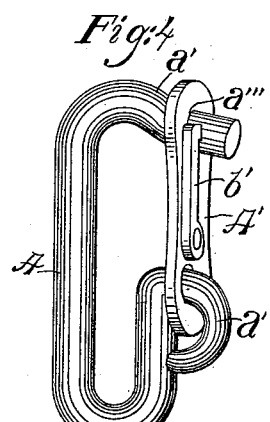
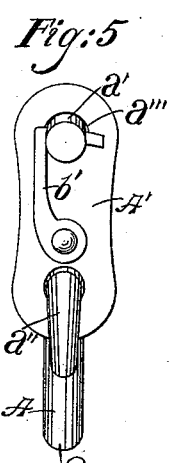
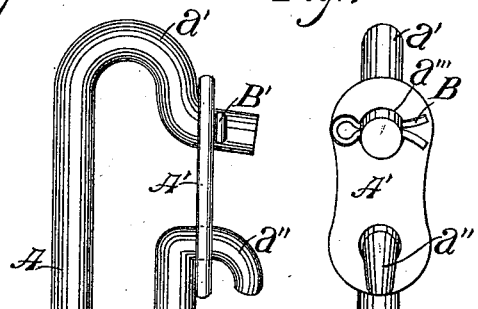
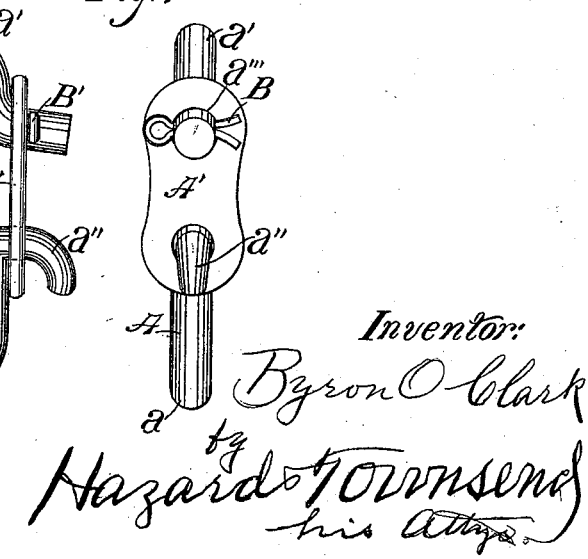
Witnesses:
F. P. Johnson.
Alfred J. Townsend.
Inventor:
Byron O. Clark
by
Hazard & Townsend
his Attys.

UNITED STATES PATENT OFFICE.

BYRON O. CLARK, OF PASADENA, CALIFORNIA.

SAFETY-CLEVIS.

SPECIFICATION forming part of Letters Patent No. 578,211, dated March 2, 1897.

Application filed April 29, 1896. Serial No. 589,483. (No model.)

*To all whom it may concern:*

Be it known that I, BYRON O. CLARK, a citizen of the United States, residing at Pasadena, in the county of Los Angeles and State of California, have invented a new and useful Safety-Clevis, of which the following is a specification.

My invention relates particularly to those clevises which are designed for use upon plows and cultivators provided at the forward end thereof with clevises having therein series of holes adapted to receive the pin of the clevis which secures the whiffletree to the plow, cultivator, or other device.

The main clevis or that which is attached to the plow, &c., is ordinarily arranged vertically, so that the pin of the other clevis which secures the whiffletree, &c., to the main or vertical clevis is arranged horizontally.

Although my clevis is adapted for use with any clevis having a series of holes arranged therein, it will be understood that in the following description my improved safety-clevis is supposed to occupy a position which brings its pin normally into a horizontal position.

My invention is also adapted to take the place of many of the clevises in ordinary use; for instance, such as are used for attaching draft-chains to wagons and whiffletrees, &c.

In the ordinary clevis, which is composed of two parallel arms having eyes in the ends thereof through which the clevis-pin is passed, difficulty is often experienced in keeping the pin in proper position, the strain upon the pin causing it to slip endwise, often shearing off the wire or other device used to retain the pin in its position in the clevis. It frequently happens that the pin becomes disengaged from the clevis while in use, and in such cases the horse lunges forward and oftentimes pulls the driver over the plow, cultivator, or other device in use, and causes serious bodily injury.

The object of my invention is to provide a clevis which will be simple, cheap, safe, and strong, and in which there will be no liability whatever of the clevis becoming accidentally detached from the plow, cultivator, or other device in use.

My invention comprises the various features of construction and combinations of parts hereinafter fully set forth and claimed.

The accompanying drawings illustrate my invention.

Figure 1 is a top view showing one form of clevis embodying my invention and especially adapted for plows and cultivators. In this view the clevis is shown closed. Fig. 2 is a perspective view of the same, showing the clevis partially opened. Fig. 3 is a side elevation of the same. Fig. 4 is a perspective view of a modified form of my invention. Fig. 5 is a side elevation of the same. Fig. 6 is a top view of another form of clevis embodying my invention. Fig. 7 is a side elevation of the same.

One especial feature of my invention is the means which I employ whereby I am enabled to make the clevis in the form of a link consisting of a body or side member having at one end a transverse pin adapted to enter the pin-holes of the main clevis, and having at the other end a hook to hook upon the clip of the doubletree or whiffletree, and connect the hook and the pin by means of a removable gate or closure so arranged that when the gate is closed it forms the other side member of the clevis and draws upon and rigidly connects the pin with the hook-shaped end, whereby I prevent the pin or the hook from yielding under excessive strain and the accidental removal of the clevis-pin from the pin-hole.

In Figs. 1, 2, and 3 in the drawings I have illustrated a form of clevis which is especially designed for use upon plows and cultivators which are provided with clevises having therein series of holes for the reception of the clevis-pin. In this form I make the link A hook-shaped at one end $a$, and at the other end I provide a laterally-projecting pin $a'$, which is formed integral with the body of the clevis and constitutes one member of the open side thereof. The hook-shaped end or member of the clevis returns a short distance toward the pin and is there bent to form an eye $a''$, and in this eye is secured one end of a latch, gate, or link A', which is perforated at such end to receive the body of the eye, and has its other end provided with a hole $a'''$, arranged and adapted to fit upon the outer end of the pin $a'$. The outer end of the pin $a'$ is arranged oblique to the axis of the clevis, so that when the latch or gate is swung in upon the end of the pin and is forced to its seat, either by means of the butterfly-nut B, which is screwed upon the end of the pin, or other means, the latch will draw upon the pin and will firmly connect the two members of the open side of the link and thus sustain the pin and the hook-shaped end against endwise strain. By this means the open side of the clevis is so rigidly connected as to make it practically as strong as the other integral side of the clevis.

It will be noted that by arranging the outer end of the pin oblique to the axis of the clevis when the gate is swung to remove it from the end of the pin it instantly clears from the pin, so that no matter how great a strain has been exerted upon the gate or link there will be no difficulty in removing the gate from the pin when it is desired to remove the clevis from the plow or other device. A shoulder $b$ is provided upon the end of the pin to prevent the gate from being forced too far inward and to also enable the butterfly-nut to be screwed tightly against the gate and prevent the gate from working loose under strain.

In Figs. 4 and 5 I have shown a modified form of my device. In these views the pin end $a'$ is bent slightly to form a hook-shaped seat for the clevis, to which it is to be attached, and the outer end of the pin is perforated to receive the end of the hook $b'$, which is pivoted to the gate and secures it in place upon the end of the pin. This form is stronger than that illustrated in Figs. 1, 2, and 3. If the pin is only slightly bent, this form may be used for the same purpose for which the forms shown in Figs. 1, 2, and 3 are especially adapted. The end of the pin $a'$ is oblique to the axis of the clevis, so that the gate will draw upon the pin as it does in the form shown in Figs. 1, 2, and 3.

In Figs. 6 and 7 the pin $a'$ is bent into hook shape, and the end of the eye $a''$ is cut off to allow the gate to be entirely removed from the link if deemed necessary. In this view a perforation is made through the pin and a cotter-key B' is inserted through the perforation to hold the gate in place.

In practice, the pin $a'$ being inserted into its seat, the gate A' is hooked upon the oblique end of the pin $a'$ and is tightly forced to its seat, after which it is securely fastened in place.

It is to be understood that the form of fastening is immaterial and that, without departing from the spirit of my invention, the device shown in Figs. 1, 2, and 3 may be provided with the fastening shown in Figs. 4 and 5 or Figs. 6 and 7, or vice versa; or an entirely different form of fastening from those shown may be employed.

By making both ends of the link integral with the body of the clevis one end of the link serves as the ordinary clevis-pin, and on account of its being rigidly attached to the body it cannot yield to strain to work loose from its position and shear or strain its fastenings. By arranging the gate to draw upon the free end of the pin the pin is strengthened and the entire clevis is made to act as a unit.

Now, having described my invention, what I claim as new, and desire to secure by Letters Patent, is—

1. The safety-clevis set forth comprising a link consisting of a side member having at one end a transverse pin, and having at its other end a hook; and having for its other side member a removable closure attached to the hooked end of the body and adapted at its other end to fit upon the pin; and means for holding the closure in its closed position.

2. The safety-clevis set forth comprising a body formed into hook shape at one end and provided at its other end with a pin arranged transverse the body of the clevis; the latch pivoted by one end to the hook-shaped end of the body and having its other end arranged to fit upon the pin and to form a closure for the open side of the clevis, and means for fastening the latch to the pin.

3. A clevis composed of a metal link having one side divided near the middle thereof, one portion of the divided side of the link being formed into a pin projecting substantially at right angles to the longitudinal portion, and having at its extremity an oblique bend, the other divided portion of the link being recurved upon itself to form a pivot-seat for the latch; a latch pivoted on the pivot-seat and having in its free end an opening adapted to receive the oblique end of the pin; and means for fastening the latch upon the pin.

4. A safety-clevis comprising a link open at one side and provided at one end with a laterally-projecting pin screw-threaded at its end; a latch pivoted to the link at the other end of the side opening and provided with a hole arranged to receive the pin; and a nut screwed upon the pin to hold the latch in place.

5. The clevis set forth comprising a body formed at one end into a laterally-projecting pin, and having its other end bent into hook shape and provided with an eye; a latch or gate having one end pivoted in the eye and having its other end arranged to fit upon the pin and to draw upon and rigidly connect the hook-shaped end and the pin; and means for securing the latch upon the pin.

BYRON O. CLARK.

Witnesses:
ALFRED I. TOWNSEND,
JAMES R. TOWNSEND.